(12) United States Patent
Schäfer et al.

(10) Patent No.: US 8,206,055 B2
(45) Date of Patent: Jun. 26, 2012

(54) MECHANISM FOR SECURING A SHAFT-HUB CONNECTION OF TWO SHAFTS

(75) Inventors: Helmut Schäfer, Ketsch (DE); Holger Schmitt, Weinstraβe (DE)

(73) Assignee: Deere & Company, Moline, IL (US)

( * ) Notice: Subject to any disclaimer, the term of this patent is extended or adjusted under 35 U.S.C. 154(b) by 509 days.

(21) Appl. No.: 12/084,474

(22) PCT Filed: Oct. 26, 2006

(86) PCT No.: PCT/EP2006/067782
§ 371 (c)(1),
(2), (4) Date: Dec. 3, 2009

(87) PCT Pub. No.: WO2007/051748
PCT Pub. Date: May 10, 2007

(65) Prior Publication Data
US 2010/0240464 A1     Sep. 23, 2010

(30) Foreign Application Priority Data
Nov. 2, 2005   (DE) .................... 10 2005 052 161

(51) Int. Cl.
*B25G 3/28* (2006.01)
(52) U.S. Cl. ............... 403/359.5; 403/359.3; 403/359.4; 74/15.4
(58) Field of Classification Search .................. 403/348, 403/353, 359.1, 359.3–359.5; 74/15.4, 15.6–15.69
See application file for complete search history.

(56) References Cited

U.S. PATENT DOCUMENTS

| | | | |
|---|---|---|---|
| 1,915,014 A * | 6/1933 | Carter | 285/80 |
| 2,665,788 A | 1/1954 | Hughes | |
| 3,245,450 A | 4/1966 | Sauter | |
| 3,517,953 A | 6/1970 | Wright et al. | |
| 3,608,936 A * | 9/1971 | Karden | 403/9 |
| 4,859,110 A * | 8/1989 | Dommel | 403/325 |
| 5,156,483 A * | 10/1992 | Mangas | 403/288 |
| 1,937,965 A | 12/1993 | Johnson | |
| 5,601,380 A * | 2/1997 | Guthrie et al. | 403/359.3 |

(Continued)

FOREIGN PATENT DOCUMENTS
DE      1 286 912       1/1969
(Continued)

OTHER PUBLICATIONS
International Search Report, Apr. 25, 2007, 10 Pages.
(Continued)

*Primary Examiner* — Joshua Kennedy

(57) ABSTRACT

A coupling mechanism secures a shaft-to-collar connection for two shafts, such as an extension shaft stub and a tractor PTO shaft. An annular locking element on the first shaft prevents an axial disconnection of an established connection. One of the shafts has a collar with a positive engagement element for a locking engagement with the other shaft. The other shaft includes a positive engagement for a locking engagement with the collar. To enable an easier handling of the axial locking of the shaft to collar connection, the locking element includes a first set of teeth which are complementarily to a second set of teeth on the second shaft. The locking element is rotatably arranged on the first shaft and can be rotated from a locked position to an unlocked position. In the locked position the teeth overlap.

12 Claims, 3 Drawing Sheets

U.S. PATENT DOCUMENTS

| | | | |
|---|---|---|---|
| 6,038,936 A * | 3/2000 | Butkovich et al. | 74/15.4 |
| 6,558,261 B1 * | 5/2003 | Nelson | 464/89 |
| 7,118,138 B1 | 10/2006 | Rowley et al. | |
| 7,874,222 B2 * | 1/2011 | Steele et al. | 74/15.4 |

FOREIGN PATENT DOCUMENTS

| | | |
|---|---|---|
| DE | 1 813 395 | 7/1969 |
| DE | 1 650 397 | 11/1970 |
| DE | 691 01 024 | 5/1994 |

OTHER PUBLICATIONS

German Search Report, Jul. 6, 2006, 4 Pages.

* cited by examiner

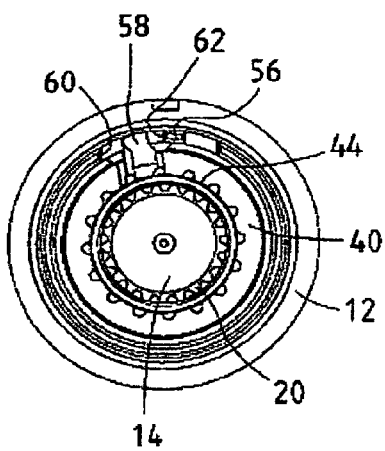
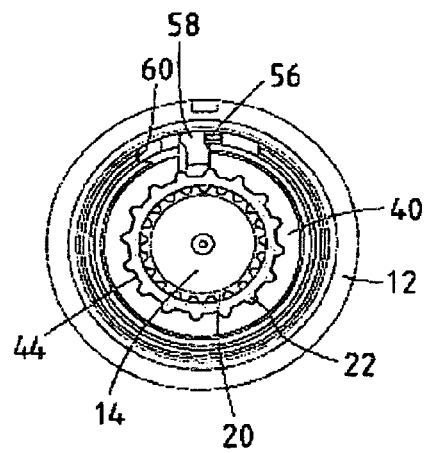
Fig. 5a  Fig. 5b
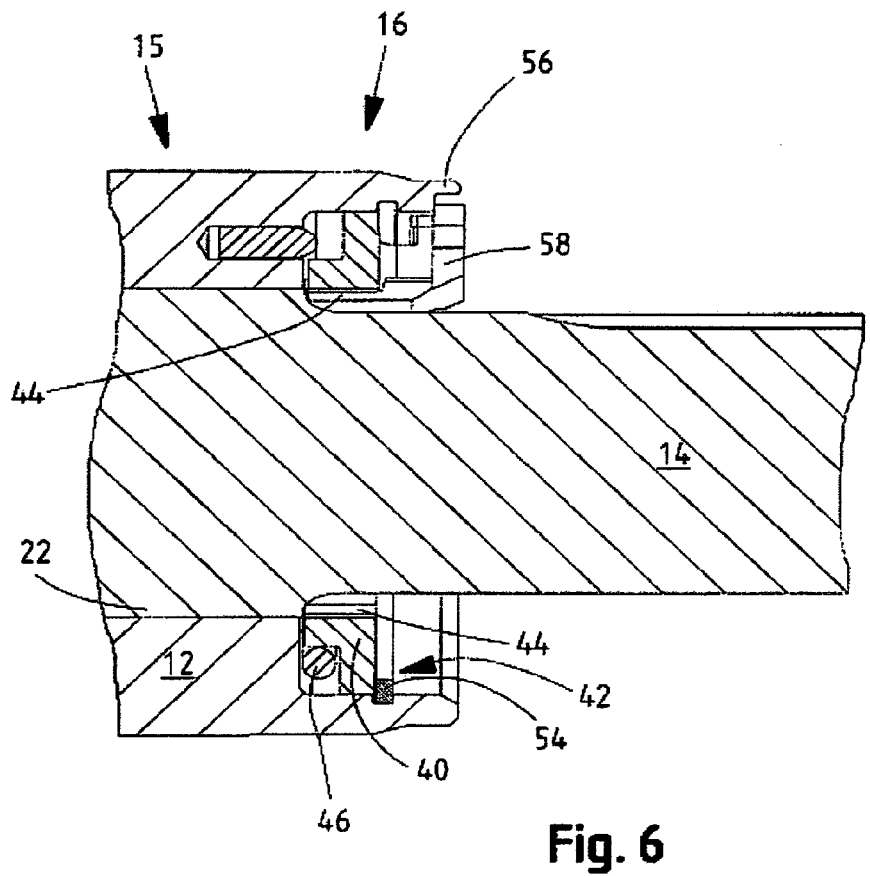
Fig. 6

MECHANISM FOR SECURING A SHAFT-HUB CONNECTION OF TWO SHAFTS

FIELD OF THE INVENTION

The present invention relates to a mechanism for securing a shaft-hub connection of two shafts, particularly for securing a power take-off extension shaft of a power take-off shaft of a tractor.

BACKGROUND OF THE INVENTION

Shaft-hub connections have been known for a long time in the state of the art and are used to connect two shafts to each other, to transfer torque from one shaft to the other shaft. A positive connection is used to transmit torque by means of mutually fitting shapes from one shaft to the other shaft. Shaft-hub connections are used, for example, in motor vehicle drive systems, particularly in cases where shaft connections have to be replaced frequently.

Thus, for example, in John Deere series 5000, 6000 and 7000 tractors, the back power take-off shaft at the tractor rear is designed so that a power take-off extension shaft is constructed as a resettable two-sided shaft. The power take-off extension shaft has a 6-tooth profile on a first end area, and a 21-tooth profile on another end area. These two profiles are described in pertinent standards. The operator can thus introduce the power take-off extension shaft with one or the other tooth profile into the power take-off shaft. Thus it is possible in a simple way to adapt different work apparatuses, each provided for operation at a standard rpm (540 or 1000 rotations per minute, rpm), with its drive shaft to the tractor, where the given drive shaft has a gear (6 or 21 tooth profile) that is complementary to the gear of the power take-off extension shaft. The resettable power take-off extension shaft is connected by an engaging gear to the drive shaft or the power take-off shaft of the power take-off shaft drive system, and secured axially by a special snap ring. The handling of this snap ring is considered to be inconvenient, particularly in the case of a power take-off shaft drive system where, as a result of the resetting of the shaft, a power take-off shaft drive switch takes place simultaneously from a 1000 transmission to a 540 transmission via an internal mechanism. For this switching, a compressive force has to be exerted on the power take-off extension shaft in the axial direction or in the driving direction to overcome an internal spring force. Simultaneously, a rotation of the power take-off shaft must occur to bring an internal switching gear into a switchable position. Consequently, the operator has to simultaneously compress with the right hand the snap ring using pliers to achieve the compression and rotation movement—which is usually produced with the left hand—and introduce it into the groove provided for the snap ring on the drive shaft.

However, in other variants of the power take-off shaft drive, in which no switch function is associated with switching of the power take-off shaft, for example, when a re-switching from the driver seat is provided, a simpler solution is desired.

SUMMARY

Accordingly, an object of this invention is to provide a shaft-hub connection assembly which is simple to use.

This and other objects are achieved by the present invention, wherein a shaft connection assembly includes a locking element which includes a gear, which is essentially complementary to a gear provided on the second of the two shafts. The locking element is twistable relative to the first shaft from a locked position to an unlocked position. In the locked position at least several of the gears or the gears are arranged so they overlap mutually. In the unlocked position, the gears do not overlap, so that the gears of the second shaft are movable in the axial direction between the gear of the locking element, thus allowing the establishment or the detachment of the shaft-hub connection. The locking element is arranged so that in the locked position of the locking element, a shaft-hub connection established between the two shafts is secured by the application of the gear of the locking element on the gear of the second shaft.

The expression "overlapping arrangement of the gears" according to the present invention denotes particularly a design of the gears of the locking element that is such that the gears are arranged and/or designed to come in contact at least in part with the gears of the second shaft with respect to the axial direction of the shaft-hub connection, preferably on the front side. The gear on the second shaft could be implemented, for example, by a front wheel or toothed wheel that is rotatably connected to the second shaft or an area of the shaft with a gear.

According to the invention it has become apparent that the locking element used in the state of the art and designed in the form of a snap ring must always be detached from an established shaft-hub connection, which, besides the mentioned problematic handling, is above all time consuming. In addition, the snap ring may be lost, which, in the case of the securing of a power take-off extension shaft to a power take-off shaft of a tractor in the field, can lead to serious interruptions in the fieldwork if the operator does not have a replacement snap ring. By the method according to the invention, the locking element instead of the snap ring is provided, and is rotatably connected to the first shaft, preferably in a way that prevents loss. Therefore, it is logically impossible for the locking element to be lost, and an interruption in the fieldwork can be prevented.

The securing mechanism according to the invention results, in a particularly advantageous way, in a simplified and improved way to ensure an appropriate shaft-hub connection. Thus, to establish a shaft-hub connection, the locking element must first be brought into its unlocked position, one of the two shafts is inserted with the means for positive connection into the hub of the other shaft, and the locking element is then brought automatically (for example, by means of a spring-generated pretension) or manually into its locked position. To detach the shaft-hub connection one proceeds in the reverse order, i.e., the locking element is moved into its unlocked position, and the shaft-hub connection is detached.

In a preferred embodiment, the locking element is arranged on an end area of the first shaft. Alternatively or additionally the locking element presents a handle area that can be gripped with the hand by an operator, and that can be twisted directly by the operator with respect to the first shaft.

It is particularly preferred to arrange the locking element on the first shaft so that, in the case of an established shaft-hub connection between the two shafts, in which one shaft would be detached from the hub of the other shaft, the gear of the locking element is arranged after the gear of the second shaft with respect to the axial direction. In other words, this arrangement then can prevent a detachment of the shaft-hub connection if the gear of the locking element and the gear of the second element are arranged so they mutually overlap.

In a particularly preferred embodiment, the gear of the locking element is essentially complementary to the means of the positive connection of the second shaft. Thus, the means for the positive connection, which usually also present a gear, also represent the gear of the second shaft, so that, to achieve a conventional shaft-hub connection, only the locking element presenting a gear needs to be provided to implement a securing mechanism according to the invention. As a result, a most advantageous way is provided to achieve a simple and intuitive handling in the establishment or the detachment of a shaft-hub connection.

In principle, the number of teeth of the gear of the locking element could correspond to the number of teeth of the second shaft. In that case, the locking element could prevent an interior gear, which presents a design that is essentially complementary to an external gear of the second shaft.

It is particularly preferred that the locking element can be pressed by means of a pretension force into its locking position. This results in a most particularly advantageous way in a simple handling, because the locking element automatically moves into its locking position, and it automatically locks after the establishment of the shaft-hub connection—for which purpose the locking element is brought into an unlocked position. An automatic locking could then occur, for example, if the gears of the locking element are no longer in mutual engagement with the gears of the second shaft, because, in that case, the locking element under pretension can twist automatically into its locked position. The locking element is preferably under a pretension which is in the opposite direction to the usual direction of rotation of the first shaft. Because a power take-off shaft of a tractor usually rotates in one direction—clockwise—the locking element closes in the opposite direction, in this case, around to the left. As a result, an unintended opening of the connection during operation—for example, if plants become hooked or stick to the locking element—is reliably prevented. For left-turning power take-off shafts (for example, in many embodiments of front power take-off shafts), the same principle can be used with a corresponding different closing direction of the locking element.

The pretension force could be generated by a torsion spring. The magnitude of the force of the torsion spring could be chosen so that, on the one hand, a reliable blocking effect of the shaft-hub connection is possible, and on the other hand, an operation of an operator with an acceptable force is possible. This can be achieved, for example, if a torque of 4 Nm±1 Nm can be generated with a torsion spring.

In particular, if the torsion element is under pretension, a preferred embodiment provides for at least one abutment to be provided on the first shaft so that with it the movement of rotation of the locking element in one direction can be limited. Therefore, the locking element under spring-generated pretension can always be set so that a corresponding part of the locking element comes in contact with the abutment of the first shaft.

The locking element is arranged preferably so that it can be twisted by a rotation angle that corresponds to a twisting of the locking element by an angle that is smaller than one tooth pitch. Thus, for example, if the locking element presents a gear with 36 teeth, where the teeth in the direction of the periphery in each case present the same mutual separation, one tooth pitch corresponds to an angle of 10°. Thus, the locking element is arranged so it can be twisted by a rotation angle of more than 0° and less than 10°, preferably 5°, that is a rotation angle of half the value. Here, it can be sufficient for the locking element to be arranged so it is twistable at most by only one tooth pitch. However, a similar securing effect can then also be achieved if the locking element is arranged so that it is twistable by a larger angle range, namely an integral multiple of the angle corresponding to the tooth pitch, to which angle the rotation angle is added. Thus, an additional abutment could also be provided, which limits the rotation movement of the locking element relative to the first shaft in a second direction of rotation.

As a function of the pretension force by means of which the locking element is pressed into its position under pretension, it may be necessary to use a tool for operation/twisting of the locking element. Accordingly, the first shaft includes a first tool engagement means. The locking element or the torsion spring presents a second tool engagement means. With the tool, the two engagement means are movable relative to each other, allowing the locking element to be moved from the locked position into the unlocked position, or vice versa. The two engagement means could be arranged with mutual separation—for example, in the direction of the periphery—if the locking element is in its locked position. To be able to move the locking element against the force of pretension of the torsion spring in the unlocked position, the two engagement means can be pressed together with conventional pliers, so that through such a procedure, a stronger pretension force can be overcome using a tool.

The internal gear of the locking element preferably presents a design such that adjacent teeth of the internal gear present in each case essentially identical mutual separations in the direction of the periphery.

The locking element is twistable with respect to the first shaft. For this purpose, it is preferred to ensure that the locking element not be arranged so it can move freely in the longitudinal direction of the first shaft, and preferably so it can almost not move in the longitudinal direction of the first shaft. This can be achieved by securing the locking element in the axial direction on the first shaft by means of a securing ring (which may optionally be constructed in the form of a snap ring). However, this securing ring needs to be applied only for the one-time installation of the locking element on the first shaft, and it does not have the function of the snap ring that is provided in the state of the art to secure the shaft-hub connection.

In concrete terms, the shaft-hub connection could be implemented by a wedge shaft connection. Adjacent wedges or teeth could present essentially identical mutual separation in the direction of the periphery. In other words, the hub could present a hollow shaft area with an internal gear in which a part of the second shaft with an external gear that is essentially complementary to the internal gear of the hub can be introduced if the shaft-hub connection is established.

Particularly for agricultural applications, it is most particularly preferred for the second shaft to comprise take-off extension shaft for a tractor. This power take-off extension shaft could have 6 tooth profile at one of its ends, and a 21 tooth profile at its other end.

BRIEF DESCRIPTION OF THE DRAWINGS

FIG. 5a is a rear view of the embodiment of FIG. 3 or FIG. 4a, in which the shaft-hub connection between the first and the second shaft is established, and in which the locking element is in its locked position;

FIG. 5b is a rear view of the embodiment of FIG. 4a or 4b, in which the shaft-hub connection between the first and the second shaft is established, and in which the locking element is in its unlocked position; and FIG. 6 is a cross-sectional view of the embodiments of FIGS. 3, 4a, 4b, 5a and 5b, in which the shaft-hub connection between the first and the second shaft is established.

DESCRIPTION OF THE PREFERRED EMBODIMENT

Figure 1:
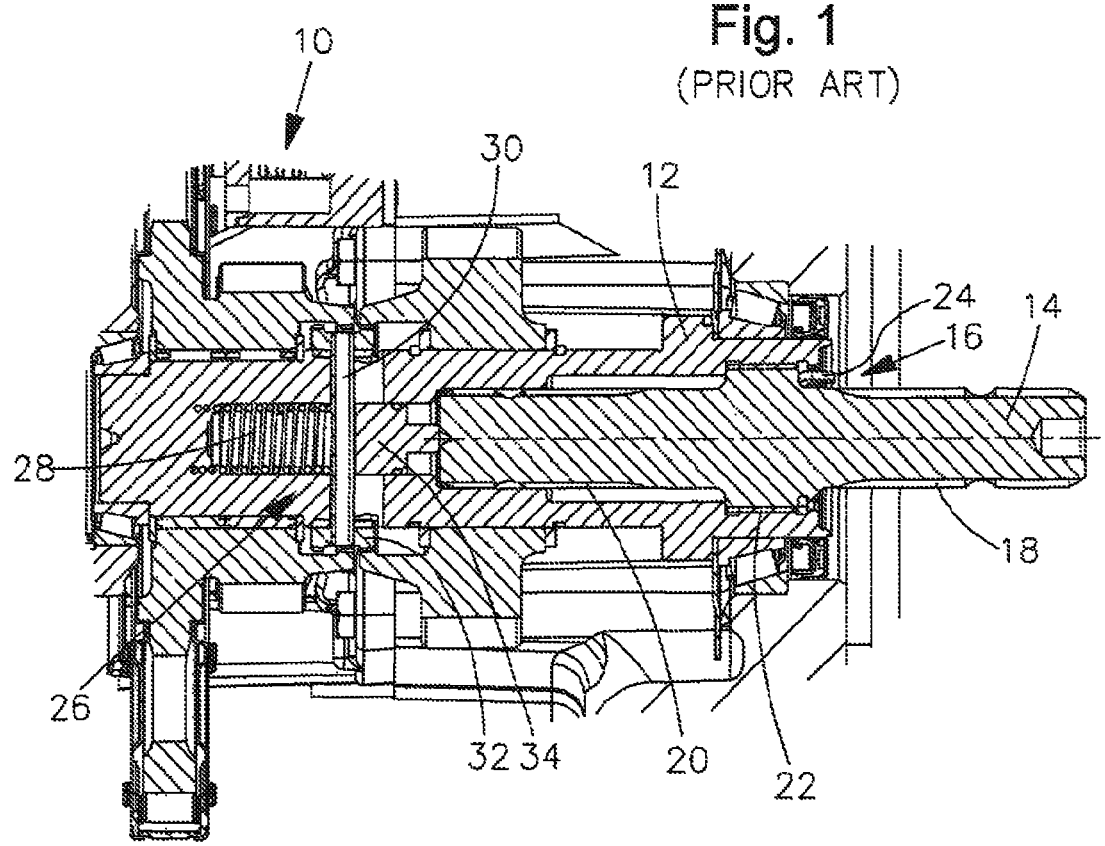
FIG. 1 is a cross-sectional view of a part of a known power take-off shaft drive, with a first and a second shaft forming a shaft-hub connection.

In the figures, identical or similar components are marked with the same reference numerals. Referring to FIG. 1, a known power take-off shaft drive 10, which is arranged at the rear of a tractor (not shown), includes a first and a second shaft 12, 14 that form a shaft-hub connection 16. The second shaft 14 in John Deere tractors of the 5000, 6000 and 7000 series, is as a resettable two sided shaft with a 6-tooth profile 18 on one end, and a 21-tooth profile 20 on the other end. Thus, the power take-off shaft can be adapted by an operator in a simple way to apparatuses with different standard rpms (540 or 1000 rpm, in accordance with the two different tooth profiles).

The second shaft 14 is non-rotatably connected to the drive shaft or the first shaft 12 by an engaging gear 22, and is secured by a snap ring 24 in the axial direction. The handling of this snap ring 24 is felt to be uncomfortable, particularly in an embodiment of the power take-off shaft drive 10 where, as a result of the conversion of the second shaft 14, a drive switching from a 1000 transmission to a 540 transmission is carried out simultaneously via an internal mechanism 26. The internal mechanism 26 comprises, among other parts, the spring 28, the pin 30, an internal switch gear 32, in which the pin 30 engages, and the intermediate piece 34, which is arranged between the pin 30 and the first shaft 14. For this switching, a compressive force has to be exerted on the second shaft 14 in the driving direction (to the left in FIG. 1), to overcome the spring force of the spring 28. At the same time, a rotation movement of the second shaft 14 must take place, to bring the internal switch gear 32 in a switchable position. The operator therefore has to simultaneously tangentially compress, for the compression and rotation movement—which is usually carried out with the left hand—the snap ring 24 with the right hand by means of pliers (not shown), and introduce it into the groove 36 of the first shaft 12.

Figure 2:
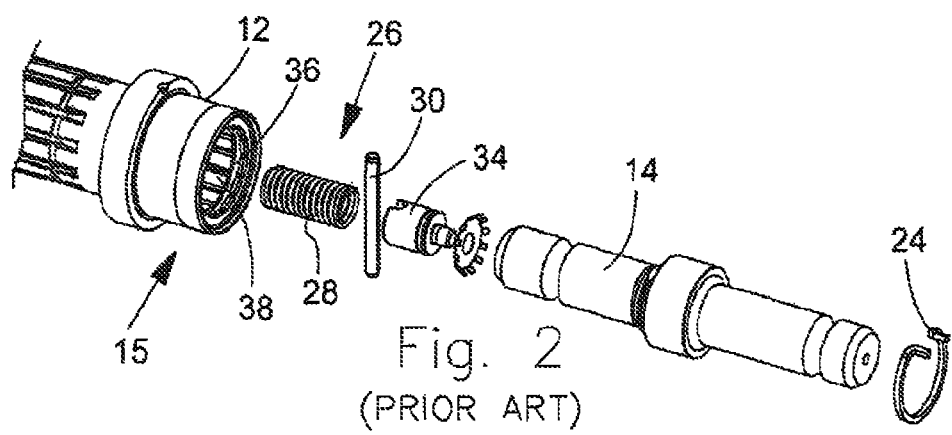
FIG. 2 is an exploded view of the first and second shaft as well as additional individual parts from FIG. 1.
Figure 3:
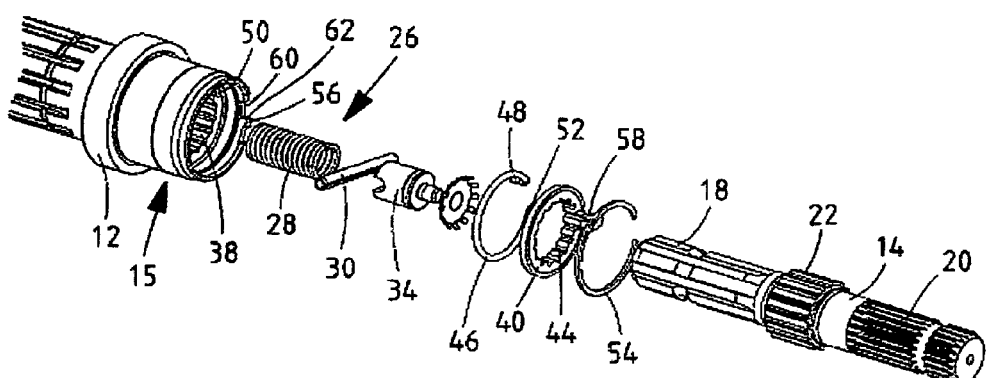
FIG. 3 is an exploded representation of components of an embodiment example according to the invention.

Referring now to FIG. 3, the second shaft 14 is designed similarly to the second shaft 14 from FIGS. 1 and 2. The second shaft 14 from FIG. 3 also includes a 6-tooth profile 18, a 21-tooth profile 20 on opposite ends as well as an engaging gear 22. Accordingly, the second shaft 14, which is a power take-off extension shaft, can be introduced into the hollow shaft area or into the hub 15 of the first shaft 12, namely to establish the shaft-hub connection 16 between the first and second shafts 12, 14. In accordance with the external engaging gear 22 of the second shaft 14, an engaging gear 38 is constructed almost complementarily to the first shaft 12, and is arranged in the hollow shaft area, where into the engaging gear, the engaging gear 22 engages with positive connection.

The locking element 40 is arranged on the first shaft 12, specifically in a hollow shaft area 42, which is provided at the end for this purpose, as shown in FIG. 6. The locking element 40 is annular and has an internal gear 44. The internal gear 44 has adjacent teeth with identical separations in the peripheral direction (see, for example, FIGS. 5a, 5b). The internal gear 44 is essentially complementary to the engaging gear 22 of the second shaft. The locking element 40 is arranged so it is twistable relative to the first shaft 12 in the hollow shaft area 42.

The locking element 40 can be pressed into its locked position by a pretension force generated by the torsion spring 46. The torsion spring 46 includes a first peg 48, which, when it is mounted in the first shaft, engages in a recess or bore 50 provided in the first shaft 12. The torsion spring 46 also includes a second peg 52, which engages in a recess (not shown) which is provided on the second engagement means 58, which is provided on the locking element 40. As a result, the torsion spring 46 exerts a torque in the direction of the locked position of the locking element 40, and thus it produces a rotation of the locking element 40 that is counterclockwise relative to the first shaft 12. The locking element 40 is secured in the axial direction in the hollow shaft area 42 of the first shaft 12 by the securing ring 54. The securing ring 54, however, has to be installed or uninstalled for the installation or maintenance of the locking element 40. In that regard, the securing ring 54 does not perform the function of the snap ring 24 from FIGS. 1 and 2, which function is similar to the detachment/establishment of the shaft-hub connection 16. Thus, the locking element 40 is provided from FIGS. 1 and 2 for the purpose of taking over the function of the snap ring 24, namely securing the shaft-hub connection 16 in the axial direction.

Figure 4A:
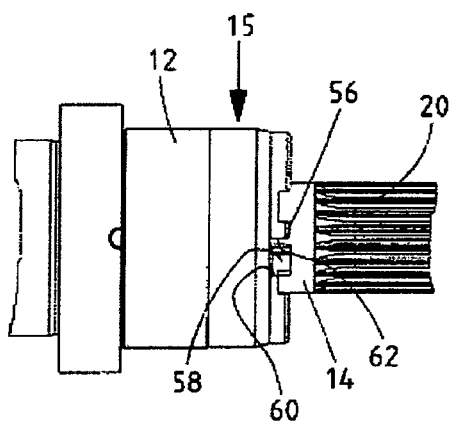
FIG. 4a is a side view of the embodiment of FIG. 3, in which the shaft-hub connection between the first and the second shaft is established, and in which the locking element is in its locked position.
Figure 4B:
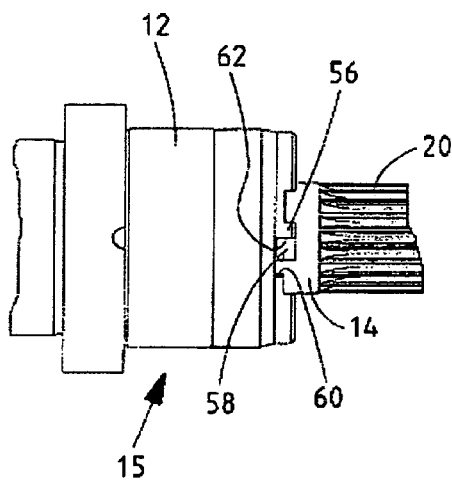
FIG. 4b is a side view of the embodiment of FIG. 3, in which the shaft-hub connection between the first and the second shaft is established, and in which the locking element is in its unlocked position.

According to FIG. 6, the locking element 40 is arranged in the end hollow shaft area 42 of the first shaft 12 such in that the internal gear 44 of the locking element 40 abuts to the external gear or engaging gear 22 of the second shaft 14 in the direction of removal of the second shaft 14. To detach the shaft-hub connection 16, the second or power take-off extension shaft 14 must be moved to the right. A detachment of an existing shaft-hub connection 16, or an establishment of a shaft-hub connection is accordingly then only possible if the internal gear 44 is arranged so it is aligned with, or covers, the engaging gear 38 of the first shaft 12. In other words, the teeth of the engaging gear 22 of the second shaft 14 engage in the gaps of the internal gear 44 of the locking element 40 and in the gaps of the engaging gear 38 of the first shaft 12 when the locking element 40 is in its unlocked position. Accordingly, the locking element 40 should be brought into such an unlocked position. Such a position of the locking element 40 is shown in FIGS. 4b and 5b. A shaft-hub connection 16 is accordingly secured if the second shaft 14 is introduced into the hub 15 of the first shaft 12, and the teeth of the internal gear 44 of the locking element 40 are arranged so they are not aligned with or do not cover the teeth of the exterior gear or engaging gear 22 of the second shaft 14. Such a position of the locking element 40 is shown in FIGS. 4a and 5a.

For simplified operation a first tool engagement means 56 is provided on the first shaft 12. On the locking element 40, a second tool engagement means 58 is provided. The second engagement means 58 can come in contact with the abutment surfaces 60, 62. The abutment surfaces 60, 62 are provided on the first shaft 12; see, for example, FIGS. 3, 4a and 4b. Thus, the abutment surfaces 60, 62 form abutments with which the rotation movement of the locking element 40 can be limited in the two directions of rotation. The two tool engagement means 56, 58 are designed so that they can be used as actuation elements on which the operator can, using conventional pliers, turn the locking element 40 relative to the first shaft 12 into the open position.

The locking element 40 can be manufactured by mechanical processing, fine casting from cast steel, fine forging, or sintering. It is also possible to conceive of using constructed multipart solutions of the locking element 40. For the use on a tractor (not shown), a heat treatment and a rust protection are provided to take into account the rough environmental conditions. The other participating parts can also be protected by a corrosion protector, for example, a zinc coating, from sluggish operation due to rust formation. In FIG. 6 it can be seen that the torsion spring 46 is arranged in front of the locking element 40 with protection from the penetration of dirt into the hollow shaft area 42 of the shaft 12.

The operation of the securing mechanism of the shaft-hub connection 16 of FIGS. 3-6 is explained below. To take out the shaft 14, the operator must turn, with a tool, such as standard pliers, the second engagement means 58 of the locking element 40 against the first shaft 12. This occurs by simple setting of the pliers on the first and on the second engagement means 56, 58, and compressing. As a result, the locking element 40 is turned into its unlocked position (shown in FIGS. 4b, 5b). Now, the second shaft 14 can be pulled out. To insert the second shaft 14, one can proceed in the reverse order. It is particularly advantageous to carry out the insertion of the second shaft 14 also without any tool, such as if the operator inserts the second shaft 14 with the engaging gear 22 into the internal gear 44 of the locking element 40 that is in its locked position, and then turns clockwise for a brief time on the second shaft 14. The resetting moment of the torsion spring 46, which is approximately 4 Nm, can be braced as a result of the inertia of the first shaft 12, so that the locking element 40 moves against the return spring force of the torsion spring 46 into its unlocked or open position. Finally, this short, possibly abruptly performed rotation movement is then followed immediately by a slight pressure in the axial direction on the second shaft 14, and then the engaging gear 22 of the second shaft 14 can be slid easily into the internal gear 38 of the first shaft 12. When the operator then pushes in the power take-off shaft further, only up to the axial abutment of the engaging gear 22, then the locking element 40 rotates automatically back due to the action of the torsion spring 46 into its locked position or blocked position, because then the engaging gear 22 of the second shaft 14 is no longer in engagement with the internal gear 44. This state is shown in FIGS. 4a, 5a and 6.

Thus, if the internal gear 44 of the locking element 40 is in a position covering the engaging gear 38 of the first shaft 12, then the second shaft 14 can be introduced through the locking element 40 into the engaging profile, or into the internal gear 38 of the first shaft 12. If the locking element 40 is then twisted by less than a whole tooth pitch, that is, for example, by half a tooth pitch, relative to the first shaft 12, then the teeth of the internal gear 44 of the locking element 40 cover the teeth of the engaging gear 22 of the second shaft 14, and thus the shaft-hub connection 16 is axial secured. For the unlocked or locked position of the locking element 40 relative to the first shaft 12, appropriate abutments 60, 62 are provided, and the locked position is put under pretension by means of the torsion spring 46, so that the locking element 40 is then always in the locked position, and can be brought into the open position (for taking out or inserting the second shaft 14) only by an external actuation of an operator, against the action of the spring force of the torsion spring 46.

The embodiment example shown in FIGS. 3-6 can be operated intuitively and immediately without difficulties, even by untrained personnel. Achieving the blocking position becomes both visually apparent by the position of the second engagement means 58 relative to the first engagement means 56 or the abutment surface 60 of the first shaft 12, as well as acoustically perceivable by a clicking noise produced when the second engagement means 58 comes in contact with the abutment surface 60 of the first shaft 12. The operator thus receives feedback regarding the proper locking, or he/she can at any time check with one look.

In the case of a power take-off shaft embodiment with simultaneous switching of the power take-off shaft transmission by switching the second shaft 14, the insertion of the engaging gear 22 through the locking element 40 occurs in the first shaft 12 in a longitudinal position of the second shaft 14 in which the latter's front-side end, which protrudes into the hollow shaft area 42 of the first shaft 12, does not yet come in contact with the internal switch mechanism, but rather this contact occurs only after an additional longitudinal shifting of the second shaft 14, so that the operator can then concentrate fully and completely on the application of a compressive force and the simultaneous indexing of the second shaft 14. In comparison to the arrangement from the state of the art, the actions to be performed by the operator are thus uncoupled particularly advantageously in the sequence.

In the known embodiment of FIGS. 1 and 2, on the other hand, the snap ring 24 had to be brought with pliers into the final position of the second shaft 14 or power take-off shaft, and then, while the second shaft 14 is being held simultaneously, inserted against the spring force of the internal switching into the groove 36.

Because the switching or the inverting of the second shaft 14 occurs frequently under field conditions with poor accessibility and under very dirty conditions, the solution according to the invention represents a particular simplification because nearly no requirements are placed on the agility of the operator.

A locking or securing of the shaft-hub connection 16 by the securing element 40 occurs against the direction of rotation of the first shaft 12. The first shaft 12 is a power take-off shaft that is arranged at the rear of a tractor (not shown). Because rear power take-off shafts in a tractor usually turn clockwise, the locking element 40 closes in the opposite direction, that is around to the left. As a result, an unintentional opening of the shaft-hub connection 16 during operation, for example, as a result of plants becoming hooked or wound on the second engagement means 58 of the locking element 40, is reliably prevented.

To prevent the risk of injury, the first and second engagement means 56, 58 are located inside the rotation contour of the first shaft 12.

The embodiment of FIGS. 3-6 fits in the space which is usually available in a power take-off shaft arrangement of a tractor. Therefore, the securing mechanism can be integrated or built by retrofitting advantageously in an ongoing series production. In a particularly advantageous way, simple, cost effective parts without special technological requirements are used. This concept can also be used advantageously without problem with front power take-off shafts and on other detachable shaft-hub connections where it is important to have both great robustness and also simple handling.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

The invention claimed is:

1. A shaft connection assembly comprising:
an extension shaft and a power take-off (PTO) shaft secured to the extension shaft, the assembly having an annular locking element for preventing disconnecting of the shafts in the axial direction, the PTO shaft having a hub with first means connecting to the extension shaft, the extension shaft having, at a distal end, second means for connecting to the hub, the locking element is arranged on the PTO shaft, characterized in that:
the locking element comprises a first gear which is complementary to a second gear, proximal of said second means, on the extension shaft, the locking element being received by a hollow portion of the PTO shaft, the extension shaft being insertable into the locking element, the locking element is twistable relative to the PTO shaft from a locked position to an unlocked position, in the locked position the gears overlap each other such that a connection between the two shafts is axially secured by engagement of the first gear with the second gear, in the unlocked position the gears do not overlap such that the gears are relatively movable in the axial direction, wherein the locking element is pressed by a pretension force into the locked position in a direction opposite a normal direction of rotation of the PTO shaft, the pretension force being generated by a torsion spring.

2. The shaft connection assembly of claim 1, wherein:
the locking element is arranged at an end part of the PTO shaft.

3. The shaft connection assembly of claim 1, wherein:
the locking element is arranged on the PTO shaft so that when the two shafts are connected, the first gear is arranged after the second gear with respect to the axial direction.

4. The shaft connection assembly of claim 1, wherein:
the first gear is complementary to the second means.

5. The shaft connection assembly of claim 1, wherein:
the first gear comprises an internal gear which is complementary to the second gear which comprises an external gear on the extension shaft.

6. The shaft connection assembly of claim 1, wherein:
the PTO shaft has an abutment to limit rotation of the locking element to one direction.

7. The shaft connection assembly of claim 1, wherein:
the locking element is arranged so it can be twisted by a rotation angle which corresponds to a rotation of the locking element that is smaller than a pitch of a tooth.

8. The shaft connection assembly of claim 1, wherein:
the PTO shaft comprises a first tool engagement means, and the locking element comprises a second tool engagement means, the first and second tool engagement means are movable relative to each other, allowing the movement of the locking element between the locked position and the unlocked position.

9. The shaft connection assembly of claim 1, wherein:
the first gear has adjacent teeth with identical separations from each other in a peripheral direction.

10. The shaft connection assembly of claim 1, wherein:
the locking element is secured in the axial direction on the PTO shaft by a securing ring.

11. The shaft connection assembly of claim 1, further comprising:
a wedge shaft connection having adjacent keys with identical separations from each other in a peripheral direction.

12. The shaft connection assembly of claim 1, wherein:
the extension shaft comprises a power take-off extension shaft for a tractor, and includes 6 or 21 teeth.

* * * * *